April 21, 1925.

A. F. VICTOR 1,534,044

CRANK CONNECTION FOR MOTION PICTURE MACHINES

Filed Dec. 10, 1923

Witness

Inventor,
Alexander Ferdinand Victor
Thomason, Roadhouse & Lundy attys

Patented Apr. 21, 1925.

1,534,044

UNITED STATES PATENT OFFICE.

ALEXANDER FERDINAND VICTOR, OF DAVENPORT, IOWA.

CRANK CONNECTION FOR MOTION-PICTURE MACHINES.

Application filed December 10, 1923. Serial No. 679,801.

*To all whom it may concern:*

Be it known that I, ALEXANDER FERDINAND VICTOR, a subject of the King of Sweden, and a resident of Davenport, in the county of Scott and State of Iowa, have invented certain new and useful Improvements in a Crank Connection for Motion-Picture Machines, of which the following is a full, clear, and exact description, such as will enable others skilled in the art to make and use the same.

My invention relates to a crank shaft clutch for cinematographic machines and especially to a structure for use upon the crank shaft or driving shaft of a motion picture camera, whereby provision is made for making connection between the actuating crank which is upon the exterior of the camera box or housing and the driving shaft for the mechanism, which is upon the interior of the box or housing. It is also an object of my invention to provide a structure of this character that is light-proof so that rays of light will not enter between the parts and cause damage to the sensitive film. It is also an object of my invention to provide means for the compensation of the flywheel so that, should an inexperienced person be operating the crank and rotate the same too fast and then suddenly slow down the speed of the crank, the balance wheel, will, by its momentum, continue to actuate the film but at a gradually reduced speed until it reaches the speed at which the operator may be actuating the crank. It is a further object of my invention to provide a structure of this character that is novel in construction; simple and dependable in operation; will not readily get out of order; and which is economincal to manufacture.

I prefer to obtain the before-mentioned objects in substantially the manner hereinafter fully described, and as more particularly pointed out in the claims.

Reference will now be had to the accompanying drawings that form a part of this specification and illustrate a typical or preferred embodiment of my invention.

In the drawings:—

Figure 1:
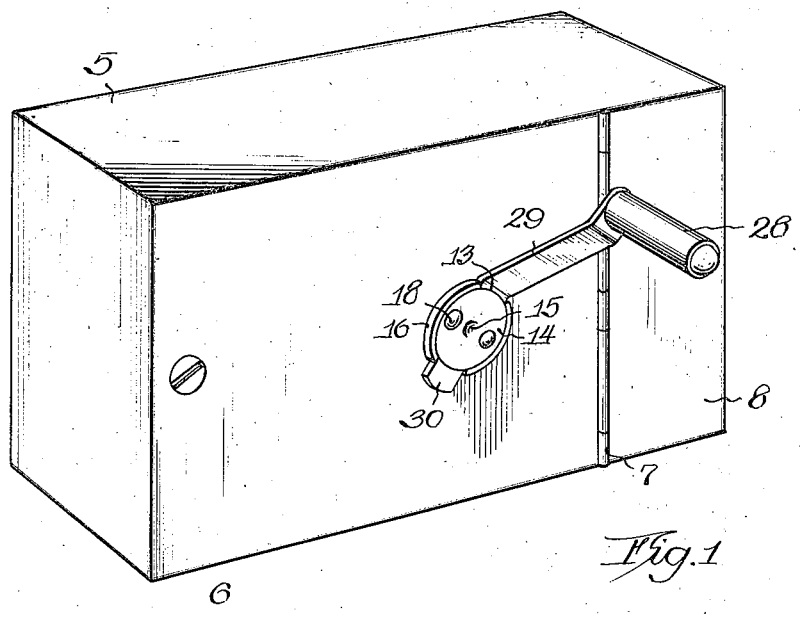
Figure 1 is a perspective, somewhat diagrammatical view, showing the exterior of a motion picture camera with my improved crank and crank connection incorporated thereon.
Figure 3:
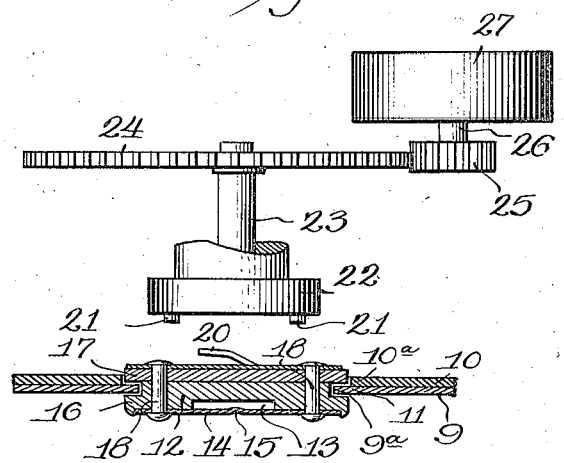
Figure 3 is a view, partly in section, showing the co-acting parts of the clutch in separated relation and with the outer member in axial section.
Figure 2:
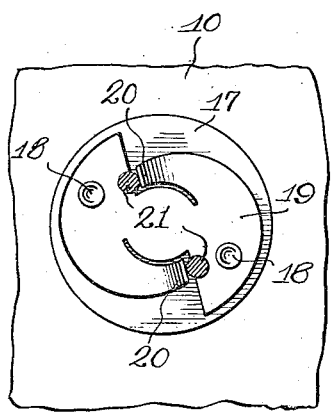
Figure 2 is a view, in elevation, of one of the members of the clutch.

In the drawings I have designated similar parts by the same reference characters wherever said parts occur throughout the several views, and by referring, first, to Figure 1, it will be seen that the camera comprises a suitable box or housing 5 of rectangular shape, one of the side walls thereof formed with a door, 6, which is connected at its forward edge by means of a hinge 7 to a stationary wall 8 extending rearwardy from the front of the camera. The box or housing 5 is preferably, of metal, and the door 6, as seen in section in Figure 3, is formed of laminated plates 9 and 10 placed face to face and secured together. An aperture is formed in this door, and the openings in the plates which provide this aperture are made in substantially the manner shown in Figure 3;—that is, the opening $9^a$ in the outer plate is of less diameter than the opening $10^a$ in the inner plate so that a shoulder 11 is provided upon the edge or periphery of the aperture.

The co-acting or clutch element that is carried by the door 6 in the aperture aforesaid comprises a disk 12, provided with a transverse channel or groove 13 extending entirely across the same, which channel or groove is covered by an outer plate or sheet 14 that has a slight indentation 15 at about the center of the channel or groove 13. The peripheral edge of this plate 12 is provided with a shoulder 16 that is formed by reducing the diameter of the disk 12 so that this reduced portion of the disk will fit into the aperture $9^a$ in the outer plate of the door, while the shouldered or wider portion of said disk will be disposed flat against the outer surface of the outer plate of the door and covers the aperture. Disposed face to face with the disk 12 and upon the inside of the door is a retaining disk 17 of substantially the same diameter as disk 12, and it is secured thereto by means of rivets 18 that pass through these two elements and through the cover plate 14, hereinbefore referred to so as to maintain these parts in intimate assembly. The diameter of the retaining disk 17 is substantially the diameter of the opening $10^a$ in the inner plate of the door 6 so that said disk 17 fits against the shoulder 11 formed by the openings in the two plates. This construction provides a very dependable element that may be rotated freely and will prevent light from entering the interior of the camera box through the aperture in which the structure is mounted. Upon the exposed face of the retaining plate or disk 17, which is inside the box when the door is closed, is one of the members of the connector or clutch whereby the crank may operatively connect with, or disconnect from the driving mechanism upon the interior of the box when the door is respectively closed or opened. This member comprises an irregularly shaped plate 19 that is secured to the face of the disk 17 by means of the rivets 18 and has spring fingers 20 formed from it that are bent outwardly or obliquely away a slight distance from the plane of the plate 19, so that, when the camera door is closed and the crank is rotated, the ends of these fingers will be moved in a path that will cause them to abut or engage projections in the shape of a pair of pins 21 mounted upon and extending laterally from the adjacent face of a rotatable disk 22 carried upon the drive shaft 23 that is suitably journaled within the camera box. These pins 21 are, preferably, diametrically disposed with respect to each other so that they will be engaged simultaneously by the fingers 20 when the crank is rotated in a clockwise direction and cause a forward movement of the drive shaft. When, however, the crank is rotated in an anti-clockwise direction, the clutch member mounted upon the door will rotate independently of the disk 22 and the fingers will ride over the ends of the pins 21 upon the disk and will not cause a rotation of the latter or the drive shaft. The shaft 23 carries upon it a large gear 24 that meshes with and drives a pinion 25 secured upon a short driven shaft 26, and the latter is provided with a balance wheel 27. When the parts of the connector or clutch are properly engaged and the crank is rotated, the shaft 23 is actuated to rapidly revolve the balance wheel and the film moving mechanism, (not shown), which is connected therewith will move the film at the desired speed. When the proper speed has been reached, or should the operator inadvertently increase the speed higher than necessary and he should suddenly slow down the rotation of the crank, the balance wheel, owing to its momentum, will continue to actuate the drive shaft 23 and the film moving mechanism connected therewith until this mechanism has been reduced in speed gradually to the speed of the crank, thus preventing the sudden jerk in the movement of the film. The crank comprises a handle element 28 connected transversely to the end of an elongated piece of metal that is bent obliquely as at 29 intermediate its ends, and its opposite end 30 is straight and of suitable dimensions to be inserted into the channel 13 in the outer disk 12 between the same and the cover plate 14, and when this end 30 of the crank is so inserted it will engage the indentation 15, and, owing to the slightly springy character of the plate 14, the crank will be frictionally held in position. This permits the crank to be readily removed or inserted whenever desired, and, when taken out of the groove 13, may be carried in the pocket of the operator, so that the exterior face of the camera will present practically no obstruction and will have only a slight embossment at the location of the connector or clutch.

What I claim is:—

1. In a motion picture camera a suitable box having a hinged door, a disk-like clutch member journaled in an aperture in said door, a second clutch member mounted within said box and having elements projecting laterally therefrom, and spring fingers upon the first-mentioned clutch member coacting with the elements upon the second-mentioned clutch member when the door is closed, whereby retarded movement of the first clutch member will permit the lateral elements of said second clutch member to move past said spring fingers and effect a gradual slowing down of said second clutch member and the mechanism associated therewith.

2. In a motion picture camera a suitable box, one of the walls of which is provided with an opening the edge of which is shouldered, and a rotatable clutch element mounted in said opening consisting of a disk-like member having a peripheral groove that is seated in said opening and guided by the shoulder thereof.

3. In a motion picture camera a suitable box one of the walls of which is hinged to an adjacent wall and is provided with an opening, a rotatable clutch element positioned in said opening, tongue and groove means for maintaining said element in rotatable relation with said wall and rendering said opening light-proof, and a coactable clutch element mounted within the box whereby the swinging of the wall upon its hinge will connect and disconnect said clutch elements.

4. In a motion picture camera a suitable box one of the walls of which is provided with an opening, a disk having a shouldered periphery the reduced portion of which is positioned in said opening, and a second disk of greater diameter than the reduced portion of the first mentioned disk and secured thereto whereby to engage the opposite face of said wall and maintain said structure in rotatable assembly with said wall.

5. In a motion picture camera a suitable box one of the walls of which is provided with an opening, a disk having a shouldered periphery the reduced portion of which is positioned in said opening, a second disk of greater diameter than the reduced portion of the first-mentioned disk and secured thereto whereby to engage the opposite face of said wall and maintain the structure in rotatable assembly in the opening, and a handle removably assembled with the first-named disk.

6. In a motion picture camera a suitable box one of the walls of which is provided with an opening, a disk having a shouldered periphery the reduced portion of which is positioned in said opening, a second disk of greater diameter than the reduced portion of the first-mentioned disk and secured thereto whereby to maintain the structure in rotatable assembly in said opening, and a clutch element mounted upon one of said disks and engageable with a co-acting clutch element within the box.

7. In a motion picture camera a suitable box one of the walls of which is provided with an opening, a disk having a shouldered periphery the reduced portion of which is positioned in said opening, a second disk of greater diameter than the reduced portion of the first-mentioned disk and secured thereto whereby to maintain the structure in rotatable assembly in said opening.

8. In a motion picture camera a suitable box one of the walls of which is provided with an opening and arranged to be moved with respect to the other wall, a rotatable clutch element positioned in said opening, tongue and groove members for maintaining said element in rotatable assembly in said opening and rendering the same light-proof, and a clutch element rotatably mounted within the box and coacting with the first-named clutch element when said wall is in normal relation to the box and disconnected from said first element when said wall is moved with respect to the other walls.

9. In a motion picture camera a suitable box one of the walls of which is provided with an opening, a rotatable clutch element positioned in said opening, tongue and groove means for maintaining said element in rotatable relation with said wall, spring fingers projecting obliquely from said element, a clutch element rotatably mounted within said box, and lateral pins carried by said last named clutch element and adapted to be engaged with said spring fingers when the first-mentioned clutch element is rotated.

10. In a motion picture camera a suitable box one of the walls of which is provided with an opening, co-actable clutch members rotatably mounted respectively within said box in said opening, tongue and groove means for maintaining one of said clutch members in the opening aforesaid, said last-mentioned clutch member having a transverse groove in its outer face, a plate covering said groove, and a handle inserted in said groove back of said plate.

Signed at Davenport, county of Scott and State of Iowa, this 6th day of December, 1923.

ALEXANDER FERDINAND VICTOR.

Witnesses:
  MAY RICHARDSON,
  ROBERT PEEKENSCHNEIDER.